(12) United States Patent
Bolz et al.

(10) Patent No.: US 6,476,134 B1
(45) Date of Patent: Nov. 5, 2002

(54) THERMOPLASTIC POLYMER MATERIAL INCLUDING A MICRODISPERSE DISTRIBUTED CROSSLINKED SYNTHETIC RUBBER AS A SECONDARY PHASE AND ITS PREPARATION

(75) Inventors: Uwe Bolz, Dormagen; Han Gerhard Fritz, Uhingen, both of (DE)

(73) Assignee: DuPont Dow Elastomers LLC, Wilmington, DE (US)

( * ) Notice: Subject to any disclaimer, the term of this patent is extended or adjusted under 35 U.S.C. 154(b) by 0 days.

(21) Appl. No.: 09/701,108

(22) PCT Filed: May 26, 1999

(86) PCT No.: PCT/US99/11553

§ 371 (c)(1),
(2), (4) Date: Jun. 7, 2001

(87) PCT Pub. No.: WO99/61526

PCT Pub. Date: Dec. 2, 1999

(30) Foreign Application Priority Data

May 27, 1998 (DE) .......................................... 198 23 626

(51) Int. Cl.$^7$ .......................... C08L 31/02; C08L 33/06; C08L 75/04
(52) U.S. Cl. ...................... 525/131; 525/54.44; 525/126
(58) Field of Search ............................... 525/54.44, 126, 525/131

(56) References Cited

U.S. PATENT DOCUMENTS

| 4,309,332 A | * | 1/1982 | Fisher | .......................... 525/170 |
| 5,747,588 A | * | 5/1998 | Mann | .......................... 525/129 |

FOREIGN PATENT DOCUMENTS

| DE | 4018716 | * | 12/1991 |
| EP | 0462471 | * | 12/1991 |

OTHER PUBLICATIONS

Chemical Abstracts vol. 118, No. 6, Feb. 8, 1993, Columbus Ohio; Abstract No. 40421Z.*

* cited by examiner

Primary Examiner—Patricia A. Short

(57) ABSTRACT

A recyclable, thermoplastic, two-phase polymer composition that includes a continuous thermoplastic polyurethane matrix phase and a soft, finely dispersed phase based on an ethylene copolymer that is normally thermodynamically incompatible with the thermoplastic polyurethane. The soft phase includes the product of a co-crosslinking reaction between the ethylene copolymer and a reactive plasticizer such as epoxidized linseed oil.

8 Claims, No Drawings

THERMOPLASTIC POLYMER MATERIAL INCLUDING A MICRODISPERSE DISTRIBUTED CROSSLINKED SYNTHETIC RUBBER AS A SECONDARY PHASE AND ITS PREPARATION

The invention generally involves a polymer material comprising a mixture of two different polymers and its preparation. One of the two polymers is modified by at least one reactive additive during mixture preparation. The reactive additive(s) alter(s) physical property(ies) of the polymer, such as hardness, plasticity and viscosity. The physical property alterations can lead, in turn, to an improvement in dispersion of the modified polymer in a matrix of the other polymer. The modified polymer is usually at least partially crosslinked or vulcanized during preparation of the polymer material. Such crosslinking preferably occurs by way of dynamic vulcanization.

Flexible, single-phase or two-phase thermoplastic elastomeric polymer materials are used today in place of traditional materials in several industrial applications. For example, the thermoplastic elastomeric polymer materials may displace typical rubber materials for any of several reasons. One reason stems from limited recyclability of rubber materials. A second reason lies in a requirement to use more expensive production technology to convert a rubber raw material into finished product than is required for a typical thermoplastic material. Typical finished products that may be formed from such thermoplastic elastomer materials include shaped structures such as shock absorbers, seals or other profiled structures, boots, shoe soles, and cover sheets ("synthetic leather"/decorative sheets).

Plasticized poly(vinyl chloride) (PVC-P) and durably crosslinked rubber materials are predominantly used today for a number of mass-produced articles such as flexible tubing, wire insulation, and consumer goods that require highly flexible polymer materials. A significant disadvantage of flexible PVC products is that one must usually add a considerable quantity of plasticizer to PVC in order to achieve a desired level of flexibility. Unfortunately, plasticizers tend to diffuse from, or exude to external surfaces of, PVC-P articles. Exposure to elevated temperatures (e.g., in excess of 35° Centigrade (°C.)), solvents or both may accelerate such diffusion or exudation. Some allege that plasticizer diffusion from articles such as toys for infants may constitute a health hazard. In the case of automobiles, plasticizer diffusion leads to a phenomenon known as fogging, an undesirable clouding of the windows. In addition, the PVC from which the plasticizer diffuses hardens over time, thereby more or less losing its functional capability. Furthermore, PVC-P in wire applications does not fulfill certain test criteria, such as hot set, due to its low softening temperature range (55–70° centigrade (°C.)). On the other hand, crosslinked rubber materials are generally used only where crosslinking of molecular chains is required for thermal, chemical, and/or mechanical reasons (for example, tubing/seals in motors or chemical installations, rollers, and durable elastic bearings.).

Polyethylenes crosslinked with silane are known as high dielectric strength wire insulation materials, primarily for medium and high voltage ranges. They also fulfill high temperature specifications (such as hot set) for this application and in addition, do not contain plasticizer (see, for example, DE-OS 23 50 876, 22 55 116, and 24 06 844). Silane-crosslinked polyethylenes with a good property profile nevertheless have a disadvantage in that silane crosslinking creates a three dimensional macromolecular spatial structure in a finished part that renders the crosslinked material resistant to remelting. As such, the crosslinked material is not recyclable. In addition, preparation of the crosslinked material involves reactive compounding, and extrudate shaping is very labor and cost intensive.

A series of other flexible and thermoplastically processible polymer materials suggested as alternatives to PVC-P may be summarized under the term "thermoplastic elastomers" (TPE). TPE materials are disclosed, for example, in European Patent Application EP 0 325 573, wherein a synthetic rubber component is used in admixture with polyethylene. TPEs have disadvantages such as their relatively high cost compared to alternate materials, potentially inadequate resistance to certain chemicals and petroleum products, and, when used for soft applications, a need for an undesirably high level of physically admixed plasticizers such as 40 to 80 parts of plasticizer per 100 parts of polymer.

Thermoplastic polyurethanes (TPE-U or TPU) are a subclass of the TPE family. They have outstanding mechanical properties that make them suitable for use in fabricating shaped structures that are subject to significant mechanical stresses, such as shoe soles, roller coverings, and conveyor rollers. TPUs may not be suitable for use in certain applications due to high cost relative to alternate materials, difficult processing when used in soft applications, and a lower hardness scale limit of 70 Shore A when used without plasticizers.

The above disadvantages help define a need or pose a problem to be solved. The need is for a highly flexible, economically produced, thermoplastically processible, soft material that is based on TPU and includes a second polymer. The material desirably avoids most of the above disadvantages of known molding materials. As an example, when the second polymer is an ethylene/vinyl ester polymer, "highly flexible" refers to a Shore A hardness (American Society for Testing and Materials (ASTM) Test D-2240) within a range of 45 to 75, preferably 45–70, and a 100% modulus (tensile modulus at an elongation of 100%) within a range of 0.5 to 2.5 megapascals (MPa). Skilled artisans can readily determine comparable properties for other ethylene copolymers, such as ethylene/(meth)acrylic acid esters, deemed suitable for use as the second polymer.

The present invention addresses this need by providing a two-phase polymer material that comprises a continuous matrix polymer phase and a co-crosslinked, microdispersed soft phase, the continuous matrix polymer phase comprising a thermoplastic polyurethane (TPU) (A) selected from the group consisting of thermoplastic polyether urethanes, thermoplastic polyester urethanes and mixtures thereof, and the dispersed soft phase comprises a product of a reaction between an ethylene copolymer (B) selected from the group consisting of ethylene/vinyl ester copolymers with a vinyl ester content within a range of 5–50% by weight of the copolymer and ethylene/(meth)acrylic acid ester copolymers with a methacrylic acid ester content within a range of 5–50% by weight of the copolymer and an additive combination (C) that comprises a reactive plasticizer and an organic peroxide. The term "(meth)acrylic" is a generic term for both acrylic and methacrylic. "Soft" refers to a Shore A hardness of 45–70. The TPU is desirably present in an amount of more than 30 percent by weight, and the reaction product is desirably present in an amount of is at least 25 percent by weight, the percentages being based on total polymer material weight and selected to total 100 percent.

The organic peroxide, when activated, yields peroxide radicals that initiate hydrogen abstraction and promote formation of carbon-carbon crosslinks in the ethylene copolymer. The reactive plasticizer contains epoxy groups that react with hydroxyl groups in the ethylene copolymer and form covalent linkages or couplings between the plasticizer and the ethylene copolymer. This reaction tends to fix the plasticizer in place, thereby reducing its ability to migrate and weaken the TPU matrix.

The two-phase materials of the present invention polymer materials are desirably prepared by (a) melt mixing a TPU (A) with ethylene copolymer (B), (b) adding additive combination (C) during melt mixing of (A) and (B) and (c) effecting both dynamic crosslinking of ethylene copolymer (B) by way of peroxide contained in additive combination (C) and co-crosslinking between ethylene copolymer (B) and the reactive plasticizer contained in additive combination (C). As an alternative, ethylene copolymer (B) may be coated with additive combination (C) outside a melt mixing apparatus, such as a twin screw extruder, and then added to the apparatus in front of or, preferably, concurrent with TPU addition. Ethylene copolymer (B) has a crystallinity that is low enough to promote spontaneous absorption of combination (C). During mixing and crosslinking, stresses (shear stress and normal stress) and deformation rates act on the polymers to disperse dynamically co-crosslinked ethylene copolymer (B) within TPU (A) in a manner sufficient to attain a desirable microdispersed distribution of co-crosslinked polymer (B) in TPU (A).

Ethylene copolymer (B) desirably exhibits certain characteristics and is selected from the group consisting of ethylene/vinyl ester copolymers with a vinyl ester content within a range of 5–50 percent by weight of the copolymer and ethylene/(meth)acrylic acid ester copolymers with a (meth)acrylic acid ester content within a range of 5–50 percent by weight of the copolymer. Interesting results may, however, be obtained with vinyl ester or (meth)acrylic acid ester contents as high as 70 percent by weight of copolymer or even higher. Skilled artisans recognize that such copolymers with such higher ester contents may require handling procedures that differ somewhat from those used to process copolymers with the 5–50 percent by weight ester content. One copolymer characteristic is a Shore A hardness of less than 70. In general a decrease in Shore A hardness increases desirability of the polymer. A second characteristic is a zero viscosity molar mass that is sufficiently high to aid in dispersion of Polymer (B) in TPU (A). As between two polymers, one with a higher zero viscosity molar mass tends to disperse more easily with a given level of crosslinking than one with a lower zero viscosity molar mass at the same level of crosslinking.

In order to provide for effective dispersion of the ethylene copolymer within a TPU matrix phase, the ethylene copolymer (designated as a disperse or "D" phase) and the TPU (designated as a continuous or "C" phase) should meet two criteria. One criteria is a volume concentration ratio $\phi_D/\phi_C$ within a range of from 35:65 to 65:35, where $\phi_D$ equals volume of the disperse phase and $\phi_C$ equals volume of the continuous phase. A second criteria is a viscosity ratio $\eta_D/\eta_C$ within a range of 0.1 to 3.5, where $\eta_D$ equals viscosity of the disperse phase and $\eta_D$ equals viscosity of the continuous phase. Ethylene copolymer (B) becomes a disperse phase when the product of the volume concentration ratio and the inverse of the viscosity ratio is less than 1 ($\phi_D/\phi_C \times \eta_C/\eta_D < 1$)

The two-phase materials of the present invention show especially advantageous properties if ethylene copolymer (B) is an ethylene/vinyl acetate (EVA) copolymer having a vinyl acetate (VA) content between 15 and 45 percent by weight (wt %) based on EVA copolymer weight. A particularly desirable EVA copolymer has a VA content of 33 wt %, based on copolymer weight.

Dynamic co-crosslinking between ethylene copolymer (B) the reactive plasticizer contained in additive combination (C) yields a reaction product with a discernible gel content. The gel content or wt % gel (determined in accord with ASTM Test D-2765) typically falls within a range of from greater than 0 wt % to 95 wt %, but is desirably within a range of 20–90 wt %, preferably 40–80 wt %, based upon reaction product weight. If desired for certain end use applications, one can extend co-crosslinking to an extent sufficient to approach or even equal a gel content of 100 wt %. As a general rule, an increase in gel content requires both incorporation of short chains into a three-dimensional network that comprises a continuous matrix polymer phase and a co-crosslinked, microdispersed phase and more extensive crosslinking. An increase in gel content equates to a concurrent reduction in percent of soluble materials. As between two gel contents, a higher gel content provides two-phase materials of the invention with an increase in elasticity and recoverability relative to the lower gel content. The increase generally accompanies a corresponding decrease in elongatability of the two-phase materials. With these relationships in mind, one can readily select an appropriate gel level for a desired application without undue experimentation. The reaction product, when incorporated into the two-phase material as provided herein desirably has an average particle size of 0.1–3, preferably 0.2–3 micrometers ($\mu m$).

The two-phase material contains an amount of TPU (A) that is desirably within a range of 70–35 wt %, preferably within a range of 60–45 wt %, based upon combined weight of (A) and the reaction product between ethylene copolymer (B) and the reactive plasticizer.

The TPU that is used as component (A) and comprises the matrix phase of the two-phase material is preferably selected from the group consisting of thermoplastic polyether urethane polymers and thermoplastic polyester urethane polymers. The TPU has a Shore A that is desirably within a range of 70–90, preferably within a range of 70–85.

Unless otherwise stated herein, all ranges include both endpoints.

Many crosslinking agents can be selected as part of additive combination (C) and used to crosslink ethylene copolymer (B) molecules with functional groups on the reactive plasticizer. While a variety of radical donors may be used as crosslinking agents, the agent is preferably a peroxide. The peroxide is preferably used in combination with a reactive plasticizer as the reactive plasticizer functions both as a co-crosslinker and as a plasticizer.

Suitable radical donors, which initiate the chain activation of ethylene copolymer (B) and thereby, its crosslinking reaction, include organic and alkyl peroxides. Peroxide selection focuses upon miscibility with the ethylene copolymer (B), when the copolymer is in its melt state, and the reactive plasticizer. As between two peroxides, one having a higher level of miscibility is preferred over one with a comparatively lower level of miscibility for a variety of reasons, one of which is a desire to use a reduced amount of peroxide to achieve a given level of crosslinking. A particularly suitable peroxide is 2,5-dimethylhexane-2,5-di-t-butylperoxide (DHBP).

Peroxides generate or donate radicals by decomposing, generally upon heating. Peroxide decomposition desirably starts above the softening temperature of ethylene copolymer (B) (e. g., above 80° C.). The peroxide preferably has a characteristic decomposition half time of radical formation at 150° C. of less than one minute. While not necessary, one may also use a vulcanization or crosslinking accelerator such as triallylcyanurate (TAC). The use of an accelerator may allow use of a lower level of peroxide or enhance effectiveness of the peroxide.

Particularly suitable reactive plasticizers include bifunctional alkyl oils that, on the basis of their chemical structure, (a) are homogeneously miscible with ethylene copolymer (B) and (b) have sufficient functionality to support formation of crosslinks between ethylene copolymer (B) molecules and the plasticizer. The reactive plasticizer is suitably an epoxidized, polyunsaturated vegetable oil such as epoxidized linseed oil or epoxidized soybean oil. In addition, other functionalized alkyl oils and/or mixtures may also be used.

The plasticizer is suitably present in an amount within a range of 10–40 wt %, based on weight of Polymer (B). The range is desirably 20–40 wt %. While plasticizer levels in excess of 40 wt % are possible, such levels require correspondingly greater amounts of a radical generator, particularly when the radical generator is an organic peroxide. Such levels provide no great benefit in terms of physical parameters and, in fact, lead to reduced tensile strength values at levels significantly above 40 wt %. This may be, at least in part, due to an insufficient degree of co-crosslinking between the plasticizer and polymer (B). At levels of less than 10 wt %, resulting two-phase materials appear to lack sufficient softness for many applications.

The two-phase materials of the present invention are thermoplastic, viscoplastic polymer materials and may, in some instances, be generically referred to as thermoplastic elastomers. The two-phase materials have desirable tensile strength and elasticity values despite their relatively low Shore hardness values (Shore A<75). The materials can also be processed into smooth extrudates with an acceptable draw-off capability. In addition, the materials exhibit an advantageously low bulk expansion or a low extrudate swell ratio that facilitates accurate production of profiled structures and other extrudates that have a complex geometry. The extrudate swell ratio ($D/D_O$) is desirably within a range of 1.05 to 1.3. D represents diameter of an extruded strand and $D_O$ represents diameter of a capillary rheometer die used to produce the extruded strand. The two-phase materials exhibit sufficient oil and gasoline resistance to enable their use in fabricating motor vehicle parts. By crosslinking polymer (B) in its dispersed state, one sees a lower volume swell in the presence of oils and gasolines relative to materials fabricated from (A) and (B) in the absence of crosslinking. This trend continues even at temperatures above room temperature. Despite the relatively low hardness noted above, the two-phase materials of the invention demonstrate desirable chemical and mechanical resistance. In addition, by using a low cost material (relative to TPU) in conjunction with a TPU, the two-phase materials have a lower cost than current commercial TPE-U polymers.

The two-phase materials of the present invention may contain one or more conventional constituents or additives, such as pigments, fillers, dyes, metal ion deactivators, flame-proofing agents, stabilizers, processing aids, and optionally, additional plasticizers. The additives or constituents, when used, may be added via conventional techniques known to those skilled in polymer melt processing. In addition, such conventional additives may be incorporated into either or both of the matrix phase and the dispersed soft phase as desired for a particular end use.

Process Description

A simple, but preferred process for preparing the two-phase materials of the invention includes several steps that are preferably implemented sequentially in the order stated. In step one, convert ethylene copolymer (B) from a solid polymer to a molten polymer. In step two, introduce additive combination or mixture (C) into molten polymer (B) and dynamically (with mixing) co-crosslink ethylene copolymer (B) with the reactive plasticizer contained in additive combination (C) to obtain a reaction product. The peroxide contained in combination (C) decomposes to yield peroxide radicals. The peroxide radicals, in turn, initiate anew ethylene copolymer (B) chain activation.

The activated chains and the reactive plasticizer contained in combination (C) form a reaction mass that yields the reaction product. The reaction product, in turn, provides an increase in viscosity relative to that observed with molten ethylene copolymer (B) prior to dynamic crosslinking. The increase in viscosity is believed to aid in dispersion of dynamically crosslinked particles or domains of (B) within a matrix formed from TPU (A) after it is added to the reaction product. As dynamic co-crosslinking (melt mixing and consequent co-crosslinking) continues, temperatures within the reaction mass increase to a temperature above the melting point of TPU (A). In step three, add TPU (A) with continued mixing for a time sufficient to obtain the two-phase material.

Recovery of the two-phase material employs conventional apparatus and procedures. Recovery desirably includes degassing to extract volatile reaction (cleavage) products from the two-phase material and thereby minimize bubble formation in the recovered product. Recovery typically includes cooling and granulation of molten polymer product for further processing into, for example, semi-finished products and preforms.

"Co-crosslinking", as used herein, refers to a chain extension reaction that occurs through radicals generated by an organic peroxide or another radical generator and functional groups that are part of the reactive plasticizer. This reaction leads to crosslinking between chains of polymer (B) and plasticizer molecules. As crosslinking occurs between two different components, rather than solely within one component such as polymer (B), it is referred to as co-crosslinking.

Apparatus selection for use in conjunction with the foregoing process is not particularly critical so long as the apparatus facilitates microdispersion of co-crosslinked ethylene copolymer (B) (the reaction product between ethylene copolymer (B) and the reactive plasticizer) in TPU (A). "Microdispersion" refers to a dispersion, preferably homogeneous, of particles having a diameter within a range of 0.1–3 micrometers. The apparatus is desirably an extruder that facilitates co-crosslinking. A closely intermeshing, twin screw extruder with co-rotating screws is particularly suitable. Other useful apparatus include mixing devices marketed under the name Buss Ko-Kneter.

While not desiring to be bound by any particular theory, it is believed that a stable phase morphology having finely dispersed, homogeneously distributed ethylene copolymer particles in a continuous TPU matrix can be achieved at plasticizer levels as high as 40 wt %, based on weight of ethylene copolymer (B) only when crosslinking starts during mixing. The particle structure of the olefinic polymer component appears to be set by the crosslinking reaction. The crosslinking reaction also appears to stabilize morphology of an otherwise thermodynamically incompatible mixture of an olefinic polymer (B), an oil or plasticizer, and a TPU. In addition, crosslinking of polymer (B) particles imparts a degree of elasticity to the particles and minimizes particle enlargement by coagulation in succeeding processing operations.

A practical effect of morphology stabilization is an ability to repeatedly process a material without affecting adversely its advantageous thermoplastic and elastic properties. In other words, such a material is recyclable.

Alternatively, both components (A) and (B) can also be metered together into a melt mixing apparatus, such as by way of an extruder feed hopper. They are then melted together before introducing additive combination (C) to effect co-crosslinking of ethylene copolymer (B) as described above. Melting together requires use of a temperature in excess of the TPU matrix polymer's melt point. If the apparatus is an extruder, introduction of additive combination (C) desirably occurs by way of an injection port. This process variation is, however, believed to be suitable only for a few types of blends for viscosity reasons. In other words, it is primarily suitable for ethylene copolymer (B) levels of less than 50 volume percent, based on combined volume of (A) and (B). Even then, ethylene copolymer (B) should have a viscosity that is sufficiently high to facilitate dispersion throughout TPU (A) with minimal dynamic crosslinking to elevate viscosity prior to effecting dispersion.

By using one of the foregoing procedures or a variation thereof, one can prepare the two-phase materials of the invention in a relatively uncomplicated process with simple, relative to expensive cascade systems, production and mixing apparatus. One can regard this process as a single-stage process with several, preferably sequential steps. Such simple equipment includes, in addition to the twin screw extruder and Buss Ko-Kneter described above, kneaders having two rollers rotating in the same direction.

This process can incorporate plasticizer incorporated in TPU polymers for the first time by co-crosslinking with a dispersible ethylene copolymer. As a result, TPU materials can be prepared in a hardness range of 45–75 Shore A without adversely affecting tensile strength of the matrix TPU. The process is believed to minimize, if not eliminate, side reactions that can result in physical property losses due to TPU chain cleavage.

The following examples illustrate, but do not limit, the present invention. Unless otherwise stated, all parts and percentages are based on weight and all temperatures are in ° C. In addition, Arabic numerals represent examples of the invention and letters of the alphabet represent comparative examples.

EXAMPLES OF MOLDING COMPOSITIONS

Table 1 lists the composition and properties of three examples (Ex.) of the invention and two comparative examples (Comp. Ex.). The comparative examples do not include an ethylene copolymer (B). The TPU for Comp. Ex. A is an aromatic polyester urethane commercially available from Morton Company, Osnabrück under the trade designation A85A. The TPU for Comp. Ex. B is an aromatic polyether urethane commercially available from B.F. Goodrich Company, Belgium under the trade designation Avalon® AE70. The EVA has an ethylene content of 67 %, based on EVA weight, and is commercially available from Atochem, France under the trade designation Evatane® 33–45. The linseed oil is epoxidized linseed oil and functions as a reactive plasticizer.

Prepare Ex. 1–3 and Comp. Ex. A and B using the preferred process described above and a co-rotating, close-intermeshing twin screw extruder with a screw diameter of 25 millimeters (mm) and a length to diameter (L/D) ratio of 48. The extruder has 11 zones that are heated to set point temperatures as follows: Zone 1=140° C.; Zone 2=150° C.; Zone 3=160° C.; Zones 4–6 and 8–10=180° C.; Zone 7=190° C.; and Zone 11 (die)=170° C. The extruder has a screw speed of 300 revolutions per minute (rpm), a head pressure of 18 bar (1.8 megapascals (MPa)), a throughput rate of two kilograms per hour (kg/hr) and a minimum residence time of five and one-half minutes. Feed the TPU into Zone 5.

TABLE 1

| Ex. Comp. Ex. no. | 1 | 2 | A | 3 | B |
|---|---|---|---|---|---|
| TPU/EVA volume ratio | 40/60 | 45/55 | 100/— | 40/60 | 100/— |
| Linseed oil (relative to EVA) [% by weight] | 15 | 15 | — | 25 | — |
| Peroxide (relative to EVA) DHBP [% by weight] | 0.2 | 0.2 | — | 0.3 | — |
| Hardness Shore A | 70–72 | 74–76 | 85–86 | 52–54 | 67–69 |
| Density [g/cm$^3$] | 1.01 | 1.03 | 1.20 | 1.02 | 1.20 |
| Tensile strength at 100% elongation [MPa] | 4.4 | 4.7 | 6.4 | — | — |
| Tensile strength at 300% elongation [MPa] | 7.5 | 8.0 | 12.4 | — | — |
| Ultimate tensile strength [MPa] | 23.5 | 29.5 | 31.6 | 7.9 | 13.9 |
| Elongation at break [%] | 920 | 890 | 740 | 970 | 940 |
| Color | Yellow, opaque | Yellow, Opaque | Transparent | Yellow, Opaque | Translucent |

—means not measured

The tensile test results shown in Table 1 show that the tensile strength declines only slightly compared to the corresponding basic TPU, but maximum tensile elongation increases. The data for Ex. 1 and 2 and Comp. Ex. A show that an increasing EVA content leads to a decrease in both Shore A hardness and ultimate tensile strength and an increase in elongation at break. The TPU of Comp. Ex. B has a lower Shore A hardness than the TPU of Comp. Ex. A (67–69 versus 85—85). The reduced hardness accompanies a lower Ultimate Tensile Strength (13.9 MPa for Comp. Ex. B versus 31.6 MPa for Comp. Ex. A) but a higher Elongation at Break (940 for Comp. Ex. B versus 740 for Comp. Ex. A). Example 3 adds 60 wt % EVA to the TPU of Comp. Ex. B and further reduces Shore A hardness to 52–54. As such, the reduction in Ultimate Strength and increase in Elongation at Break relative to Comp. Ex. B meet expectations as established by a data trend between Comp. Ex. A and Comp. Ex. B.

As a general rule, formulation parameters such as TPU/EVA volume ratio and plasticizer (epoxidized linseed oil) affect physical property parameters including ultimate tensile strength and elongation at break. While not shown, an increase in gel content and crosslink density tends to improve physical property parameters like compression set and tension set values. Skilled artisans can readily vary formulation parameters and gel content/crosslink density parameters to attain an optimum result for a desired end use application. Similar results are attainable with other composition variations, all of which are disclosed above and encompassed by the appended claims.

As expected, the values for breaking elongation increase for material containing plasticizer. Although not shown in Table 1, dynamic co-crosslinking yields an increase in composition melt viscosity and melt strength relative to TPU alone. One hypothesis suggests that the discrete crosslinked particles of ethylene copolymer act like a filler and promote an increase in viscosity. Skilled artisans can readily determine an increase in melt strength via standard test protocol such as a "Rheotens" test. The compositions of the present invention (Ex. 1–3) do have a reduced ultimate tensile strength relative to that of a pure TPU (Comp. Ex. A and B) but do so with a concurrent reduction in Shore A hardness. As a result, extrudates having a very smooth surface and good draw-off capability can be formed in extrusion trials in contrast to the basic TPU. The compositions of Ex. 1–3 should yield a very low extrudate swell ratio, an indication of good extrusion processibility. A low extrudate swell ratio is advantageous, particularly if profiled products having complex geometry and/or high dimensional stability are to be produced.

Compared to other soft TPE types (for example, styrene/ethylene-butene/styrene or SEBS), the superior mechanical, oil, grease, and gasoline resistance of the dynamically crosslinked polymer material is of great practical application, for example, in use as a cover sheet or shoe soles. Above all, the dynamically crosslinked polymer material of Ex. 2 achieves, even at a Shore A hardness of 74–76, which is not reached with standard polyester urethane types, an ultimate tensile strength value of almost 30 MPa and thereby opens fields of use that are not accessible to either polypropylene/EPDM blends or SEBS or PVC-P compounds of similar Shore hardness. For example, a composition that contains 50 wt % polypropylene (PP) and 50 wt % ethylene/propylene/diene terpolymer (EPDM), both percentages based on combined PP and EPDM weight, as well at 60 wt % paraffinic oil, based on EPDM weight, has a Shore A Hardness of 75, with an ultimate tensile strength of 6.8 Newtons per square millimeter (N/mm$^2$) (6.8 MPa).

What is claimed is:

1. A two-phase polymer material that comprises a continuous matrix polymer phase and a co-crosslinked, microdispersed soft phase, the continuous matrix polymer phase comprising a thermoplastic polyurethane (A) selected from the group consisting of thermoplastic polyether urethanes, thermoplastic polyester urethanes and mixtures thereof, and the dispersed soft phase comprises a product of a reaction between an ethylene copolymer (B) selected from the group consisting of ethylene/vinyl ester copolymers with a vinyl ester content within a range of 5–50% by weight of the copolymer and ethylene/(meth)acrylic acid ester copolymers with a methacrylic acid ester content within a range of 5–50% by weight of the copolymer and an additive combination (C) that comprises a reactive plasticizer and an organic peroxide.

2. The two-phase material of claim 1, wherein the thermoplastic polyurethane is present in an amount of more than 30 percent by weight and the ethylene copolymer is present in an amount of at least 25 percent by weight but less than 70 percent by weight, all percentages being based on combined thermoplastic polyurethane and ethylene copolymer weight and selected to total 100 percent by weight.

3. The two-phase material of claim 1, wherein the reaction product has a gel content (determined in accord with ASTM Test D-2765) of 20–95% by weight, based on reaction product weight.

4. The two-phase material of any of claims 1 to 3, wherein the dispersed phase has an average particle size of 0.1 to 3 microns.

5. The two-phase material of claim 4, further comprising at least one additive selected from pigments, fillers, dyes, flame-proofing agents, stabilizers, metal ion deactivators, processing aids, and optionally, plasticizers other than the reactive plasticizer in additive combination (C).

6. The two-phase material of claim 1, wherein the reactive plasticizer component is a polyfunctional, long-chain oil selected from epoxidized linseed oil or epoxidized soybean oil.

7. The two-phase material of claim 1, wherein the reaction product is a co-crosslinked product of a reaction between ethylene copolymer (B) and the reactive plasticizer.

8. The two-phase material of claim 1, wherein the dispersed phase has a Shore A hardness of 45–70.

* * * * *